C. E. BRADDY.
STRAW RACK.
APPLICATION FILED APR. 8, 1920.
1,386,048.
Patented Aug. 2, 1921.
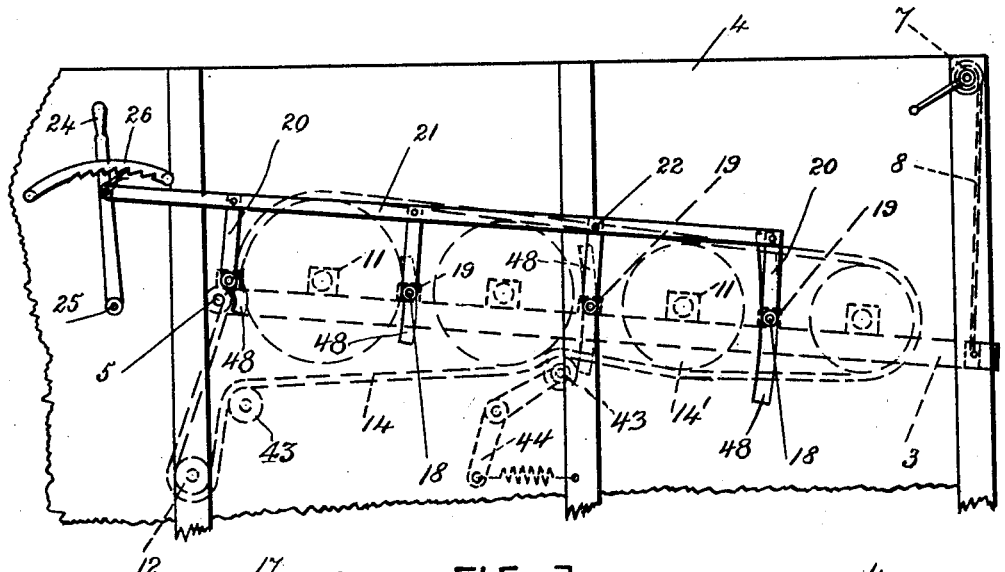
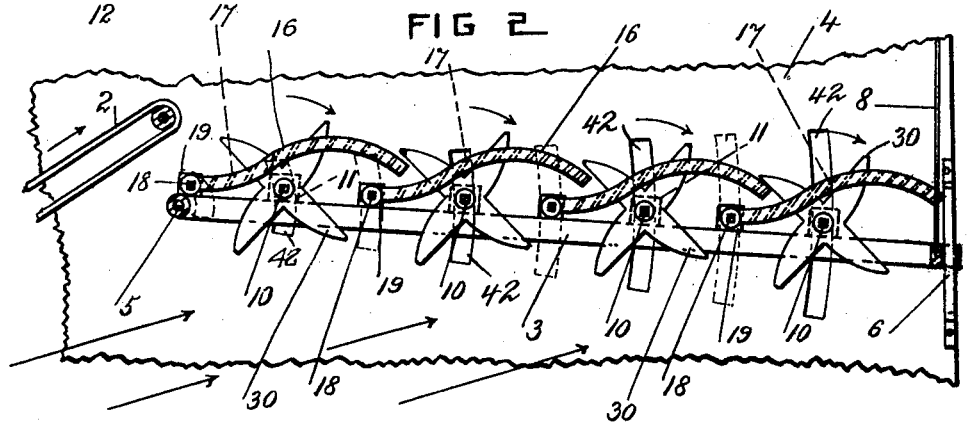
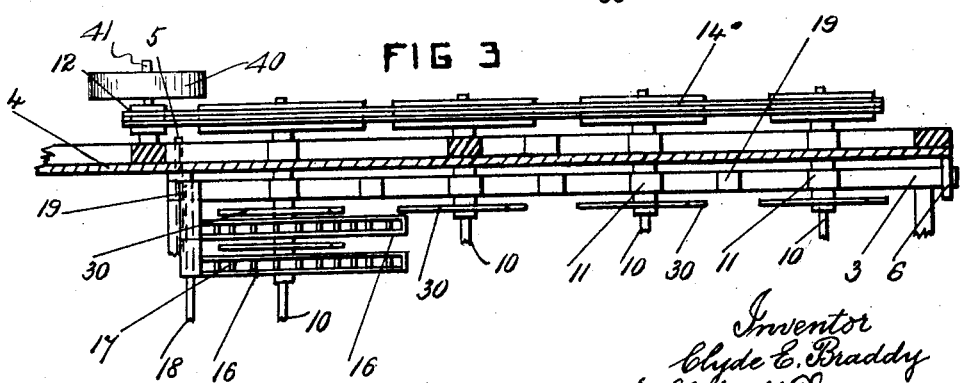
Inventor
Clyde E. Braddy
by Herbert W. T. Jenner
Attorney

UNITED STATES PATENT OFFICE.

CLYDE E. BRADDY, OF PINEBLUFF, WYOMING, ASSIGNOR TO WYOMING THRESHER COMPANY, OF PINEBLUFF, WYOMING.

STRAW-RACK.

1,386,048.     Specification of Letters Patent.     Patented Aug. 2, 1921.

Application filed April 8, 1920. Serial No. 372,256.

*To all whom it may concern:*

Be it known that I, CLYDE E. BRADDY, a citizen of the United States, residing at Pinebluff, in the county of Laramie and State of Wyoming, have invented certain new and useful Improvements in Straw-Racks, of which the following is a specification.

This invention relates to straw racks used in grain separators for agitating the threshed material so that the grain may fall from the straw by gravity; and it consists of a series of grates and revoluble pickers constructed as hereinafter fully described and claimed.

In the drawings, Figure 1 is a side view of a portion of a grain separator constructed according to this invention. Fig. 2 is a longitudinal section through the same showing the grates and pickers. Fig. 3 is a plan view of the devices for revolving the pickers, showing also some of the grates and pickers.

The threshed material is discharged onto the front end portion of the straw rack by any approved means, such as an endless conveyer 2, a portion only of which is shown. A frame 3 is arranged in the middle and rear end portions of the casing 4 of the grain separator, and this frame is pivoted to the casing at its front end by a pivot or hinge 5. The rear end portion of the frame 3 slides vertically in guides 6 on the casing, and is adjusted and supported by any approved means. A winding barrel 7 is shown for adjusting the frame, and 8 is a cord which connects the frame with the winding barrel.

Picker shafts 10 are journaled in bearings 11 on the frame 3, and are arranged parallel to each other at suitable distances apart. These shafts project through slots 42 in the rear side of the casing, and are revolved by any approved driving devices. A wheel 12 is shown, on a driving shaft at the front end of the series, for driving all the pickers. The wheel 12 is secured on a driving shaft 41 which has a driving pulley 40 secured on it. A flexible driving connection 14 passes over the wheel 12 and over driving wheels 14' secured on the shafts 10 of the pickers. Suitable guide sheaves 43 are provided for the flexible driving connection 14, and 44 is a tightener device for keeping it taut.

The revoluble picker shafts are driven from the said shaft by the wheels 14' which are preferably proportioned so that the rear end picker is driven at a greater speed than the front end picker, and so that the intermediate pickers are driven at progressively increasing speeds from the front to rear.

Each picker 30 consists of a series of thin star-shaped blades secured on the picker shaft at suitable distances apart. The straw is supported by curved grates. Each grate is formed of a series of curved grate bars 16 having upwardly and rearwardly inclined slats 17. These grate bars are secured at their front ends on shafts 18 which are journaled in bearings 19 on the frame 3. The curved grate bars project rearwardly over the picker shafts, and are arranged between the blades of the pickers.

The shafts 18 project through slots 48 in the front side of the casing, and have arms 20 secured on their end portions. The arms 20 are pivoted to a coupling-bar 21 by pins 22, and 24 is a lever pivoted to the casing by a pin 25, and pivoted to one end of the coupling-bar, and affording a means for simultaneously adjusting the height of all the grates above the picker shafts. A catch device 26 is provided for holding the lever 24 in position. Each grate can be adjusted separately in any approved way independently of its arm 20 and the coupling bar.

A blast of air is driven upwardly and rearwardly through the grates in the direction of the straight arrows in Fig. 2, and the pickers are revolved in the directions of the curved arrows.

The straw is agitated by the pickers, and is moved rearwardly with gradually increasing speed, and is discharged at the rear end of the machine. The rear end of each grate is preferably arranged to overlap the front end of the grate next in front of it, and the grate bars are preferably curved and formed so that the upper sides of their front end portions are concave and their rear end portions convex. The adjustment of the rear end portion of the frame 3 enables the straw to be moved over the rack and discharged with more or less freedom as its condition renders desirable. The grain falls between the slats of the grate bars against the pressure of the blast of air, and is subsequently collected and delivered to grain cleaning mechanism or devices of approved construction.

What I claim is:

1. In a straw rack, a frame pivoted at its front end, a series of pickers journaled in the frame, a series of grates connected at their front ends to the frame and projecting rearwardly over the axes of the pickers to which they pertain, each picker comprising a row of picker blades and each grate comprising a row of grate bars, and means for adjusting the rear end portion of the frame vertically.

2. In a straw rack, a frame pivoted at its front end, a series of pickers journaled in the frame, means for revolving the pickers at progressively increasing speeds from the front end to the rear end of the rack, a series of grates connected at their front ends to the frame and projecting rearwardly over the axes of the pickers to which they pertain, each picker comprising a row of picker blades and each grate comprising a row of grate bars, and means for adjusting the rear end portion of the frame vertically.

3. In a straw rack, a frame pivoted at its front end, a series of pickers journaled in the frame, a series of grates connected at their front ends to the frame and projecting rearwardly over the axes of the pickers to which they pertain, each picker comprising a row of picker blades, and each grate comprising a set of grate bars having upwardly and rearwardly inclined slats, and means for adjusting the rear end portion of the frame vertically.

4. In a straw rack, a series of revoluble pickers, each picker comprising a row of picker blades, a series of grates arranged one behind another and pivoted at their front ends, each picker being provided with a separate grate which projects over its axis and each grate comprising a row of grate bars, and means for adjusting the grates pivotally.

5. In a straw rack, a series of revoluble pickers, a series of grates pivoted at their front ends and projecting rearwardly over the axes of the pickers to which they pertain, each picker comprising a row of picker blades and each grate comprising a row of grate bars, arms secured to the said grates, and a coupling-bar pivoted to the arms and affording a means for adjusting the grates pivotally and simultaneously.

6. In a straw rack, a series of revoluble pickers, a series of grates pivoted at their front ends and projecting rearwardly over the axes of the pickers to which they pertain, each picker comprising a row of picker blades and each grate comprising a row of grate bars, the free rear end portion of each grate being arranged to overlap the front end of the grate next in front of it, and means for adjusting the said grates pivotally.

In testimony whereof I have affixed my signature.

CLYDE E. BRADDY.